W. R. PETERSEN.
TIRE TREAD ATTACHMENT.
APPLICATION FILED JUNE 14, 1919.
1,349,626.
Patented Aug. 17, 1920.
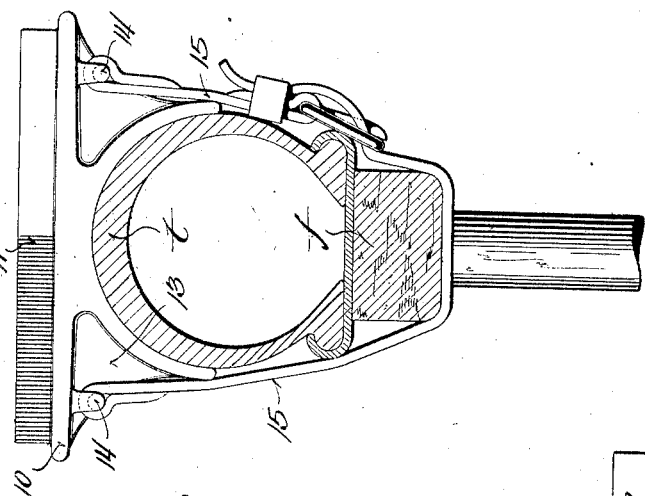
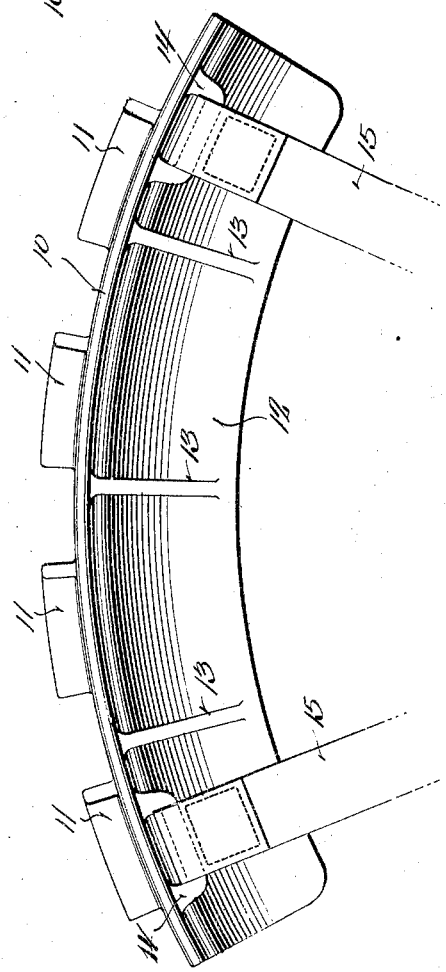
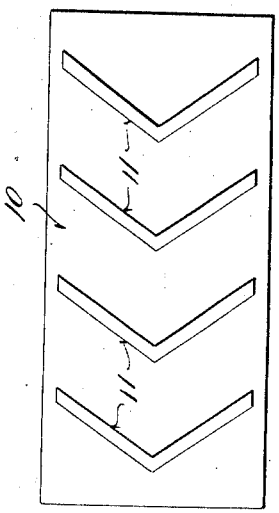
Inventor:
Walter R. Petersen
By Young & Young
Attorneys.

UNITED STATES PATENT OFFICE.

WALTER R. PETERSEN, OF MILWAUKEE, WISCONSIN.

TIRE-TREAD ATTACHMENT.

1,349,626.   Specification of Letters Patent.   Patented Aug. 17, 1920.

Application filed June 14, 1919. Serial No. 304,143.

*To all whom it may concern:*

Be it known that I, WALTER R. PETERSEN, a citizen of the United States, and resident of Milwaukee, in the county of Milwaukee and State of Wisconsin, have invented certain new and useful Improvements in Tire-Tread Attachments; and do hereby declare that the following is a full, clear, and exact description thereof.

My invention relates to new and useful improvements in tread attachments for the tire of an automobile or similar vehicle wheel whereby to provide for an increased gripping action of the wheel on the roadway to procure propulsion of the wheel out of a rut or to facilitate its travel over snow or other difficult road surface.

It is primarily the object of my invention to provide a device of this character which is of maximum efficiency, which is simple in structure and durable under severe operating conditions, and which may be most readily attached to or removed from the vehicle wheel.

It is more particularly my object to provide a tread attachment which, incidental to its formation for procuring an efficient gripping action, has such engagement with the vehicle tire as to provide an arrangement preventing transverse slippage of the device about the tire, this being procured both by the novel shape of certain parts and the coöperative relationship between the same and other parts including the retaining straps or the like.

With the above and other objects and advantages in view, which will be apparent as the description proceeds, my invention resides in the novel features of construction, combination and arrangement of parts as hereinafter described and defined by the appended claim.

In the accompanying drawings:

Figure 1 is a side elevational view of a tire tread attachment embodying my invention.

Fig. 2 is a transverse sectional view through the device and a tire on which it is mounted.

Fig. 3 is a plan view of the device looking toward the tread surface thereof.

Referring now more particularly to the drawing, my improved tread attachment comprises an elongated transversely flat tread section 10 which is longitudinally curved throughout its length to correspond to the curvature of a minor segment of a wheel and which is from 12 to 15 inches long in accordance with the size of the tire to which it is attached, said tread member being equal in width substantially to twice the cross sectional diameter of the tire. The outer face of the tread section is provided with a series of calk ribs 11 which may be arranged in any desired manner to procure a maximum gripping action on the traction surface. A trough shaped tire seating section 12 is secured at the inner surface of the tread section 7, preferably by integral connection of its longitudinal medial portion with the corresponding portion of the tread section 10, the trough section being longitudinally curved concentric with the curvature of the tread section 10 and having its transverse curvature in conformity to the tread curvature of the tire, the depth of the trough of the section 12 being approximately equal to half the cross sectional diameter of the tire. The sides of the trough of the tire seating section 12 are connected at intervals with the side portion of the tread section 10 by preferably integral brace webs 13. Strap loops 14 are provided at the corner portions of the tread section 10 for securement of straps 15 adapted to be passed about the felly $f$ of a tire $t$ on which the device is mounted, whereby the device is held in engagement with the tire.

It is, however, particularly noted that the device is held against normal transverse sliding movement on the tire by its interlocking engagement with the tire procured by the decided longitudinal and transverse curvature of the tire seating section 12. Moreover, other means are also provided for reducing as much as possible the likelihood of transverse turning of the device. That is to say, the loops 14 are so located with respect to the longitudinal edges of the tire seating section 12, that the straps 15 will be in engagement with the portions adjacent said edges and relatively close to the walls of the tire near said edges, whereby when there is a tendency of the attachment to turn, the edge portion of the tire seating section in the direction of turning movement will be wedged between the straps and the adjacent surface of the tire wall to limit or retard movement. The straps are moved more closely toward the tire wall under such condition.

An exceedingly simple device has thus been provided, which has in operation proven highly efficient in extricating a vehicle wheel from a rut in the road in which the wheel has been engaged, and which has proven highly efficient in travel over yielding road surface.

I am aware that it has been heretofore proposed to apply tread members to a tire which are of greater width than the width of the tire and that it has been proposed to apply a tread attachment to a tire which is curved to correspond to the longitudinal circumference of the tire. My improved tread section, however, possessing the width of the former type and the length of the latter type, procures decided operative advantages inasmuch as the width of the tread section permits it to straddle a rut in which the wheel has become engaged, while its length affords sufficient tread surface of the ground engaging portions of the tread section to prevent it from digging into the rut. At the same time, the longitudinal curvature carried out in the tire seating section 12 procures its interlocking engagement with the tire. A further important point is noted that by reason of the longitudinal curvature of the tread section, and the slight width of the connecting portion of the tread and tire sections of the device, the ends of the tread surface of the device are disposed closely adjacent and are from practical considerations tangential to the tread surface of the tire, as indicated in Fig. 2 of the drawings.

While I have shown and described a preferred embodiment of my invention, it will be appreciated that various changes and modifications of structure within the scope of the appended claim may be employed without departing in any manner from the spirit of my invention.

What is claimed is:

A tire tread attachment comprising an elongated tread section which is transversely flat and longitudinally curved to correspond to the circumferential curvature of a minor segment of a tire, said tread section having a substantially greater width than the width of the tire, a trough-shaped tire seating section substantially curved both longitudinally and transversely to conform to the curvatures of the tire surface and connected longitudinally along its medial portion with the medial portion of the tread section, said tire seating section having its trough substantially equal in depth to one-half the cross sectional diameter of the tire whereby to fit against the sides of the tire, said tire seating section having its trough of sufficient length to procure interlocking relation with the tire portion disposed therein to prevent slipping movement of the device transversely about the tire upon application of stresses tending to procure such slipping movement, a gripping and retaining strap secured at its opposite ends to the tread section and adapted to embrace the felly and tire of a wheel, said strap being in engagement with the longitudinal edge portion of the tire seating section and close to the adjacent portion of the tire when drawn tightly thereabout and about the felly, whereby when the attachment tends to turn transversely of the tire, the edge portion of the tire seating section in the direction of its movement will be wedged between the strap and the adjacent surface of the tire wall to limit or retard movement of the attachment, said strap being moved more closely toward the tire wall under such conditions.

In testimony that I claim the foregoing I have hereunto set my hand at Milwaukee, in the county of Milwaukee and State of Wisconsin.

WALTER R. PETERSEN.